UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PLASTIC MASSES AND METHOD OF PRODUCING THE SAME.

1,090,439. Specification of Letters Patent. Patented Mar. 17, 1914.

No Drawing. Application filed October 7, 1911. Serial No. 653,401.

*To all whom it may concern:*

Be it known that I, JONAS W. AYLSWORTH, a citizen of the United States, and a resident of East Orange, in the county of Essex and State of New Jersey, have made a certain new and useful Improvement in Plastic Masses and Methods of Producing the Same, of which the following is a description.

My invention relates to plastic masses suitable for molding into various objects in suitable molds and subsequently curing to harden either in the mold or separate from the mold in suitably regulated ovens.

It relates more specifically to the class of plastics known as phenolic condensation products.

The invention has for its principal object the production of a mass of the character referred to which may be worked on cold or slightly warmed mixing rolls and calendered into sheets or squirted into rods or tubes through suitable dies, and subsequently hardened by heat into an infusible insoluble condition. The valuable properties which it is desired to attain for the mass in order to render its use practical in the art of molded plastics, are freedom from moisture, plasticity when cold or when slightly warmed, and capability of being hardened by heat or heat and pressure, to an infusible insoluble state while in the mold without sticking thereto, or to be hardened by heat without pressure in an oven or in oil baths after having been molded cold.

Accordingly, the objects of my invention are the production of such masses as compositions of matter and the processes by which the same are formed or which are incidental to the formation thereof, all as will be more clearly described in the following specification and particularly pointed out in the appended claims.

My invention comprises three classes of masses.

First, powdered masses for molding in chase molds by pressure when cold or when moderately heated, to say 60° C. These masses are adapted to be cured by heating in an oven without pressure.

Second, solid masses, such as slabs or sheets, which will be sufficiently plastic when cold or at temperatures below 60° C. to readily flow when subjected to pressure in the molds and which may be hardened rapidly in the mold by the application of heat without sticking or having any objectionable shrinkage.

Third, masses similar to the second class, adapted to be formed by cold pressure and subsequently subjected to a drying or curing operation in an oven without pressure.

Masses of the first class are made by first obtaining a fusible soluble phenol resin which should be completely dehydrated. A resin of this character is described in my copending application, Ser. No. 496,060, filed May 14, 1909, and my Patents 1,020,593, granted March 19, 1912, and 1,029,737, granted June 18, 1912, and this resin in completely anhydrous form, is considered by me to be the substance best adapted for my present purpose. This resin is formed, as described in said applications, by condensation reaction between a phenol and formaldehyde or equivalents in such proportions and in such a manner that the formaldehyde in the resin produced is all combined with phenol and there is no free phenol in the mass or only a small ascertainable amount thereof. This product is completely dehydrated as by heating the same to a temperature of approximately 400° F. under atmospheric pressure.

To prepare masses of the first class such a dehydrated phenol resin is preferably mixed with a suitable volatile solvent, such as alcohol, either methyl or ethyl, or with acetone in proportions which may vary between 100 parts of the phenol resin and 90 to 150 parts of the solvent. From 8 to 12 parts of a methylene-containing hardening agent for the phenol resin are dissolved in the solution, the hardening agent being preferably hexa-methylene-tetra-amin. A suitable filler is then thoroughly mixed in the composition thus formed, suitable fillers being such as wood flour, powdered infusible insoluble phenolic condensation products, cotton flock, or suitable mineral fillers, such as clay, barium sulfate, plaster of Paris, silica, zinc oxid, or the like. The solvent is then dried out of the mixture, the filler being so proportioned as to comprise from 40 to 90 per cent. of the weight of the mass. The solvent is recovered during the drying operation.

The use of the volatile solvent, described above, might be dispensed with, by mixing the resin and the hardening agent on mixing rolls or otherwise finely powdering the mixture and mixing with the filler. But the best results are attained by the use of the solvent. This mass, prepared with or without the use of the volatile solvent, when thoroughly dry, is powdered and mixed with a fluid which will be absorbed by the resin binder and convey to it the properties of being plastic when cold and may remain in the mass after subsequent curing or hardening or may be partly removed by a drying operation after molding to shape and before hardening by heat. The substances which I find particularly suited for this purpose are eugenol, mono-chloro-naphthalene, mono-chloro-phenol, phenol, cresol, acetylene-tetra-chlorid, oil of mirbane, oil of camphor or mixtures of the same. Phenol, referred to, is a crystalline body, but becomes fluid on heating, and remains fluid when mixed with certain bodies, such as eugenol, or the phenol resin referred to above. Certain of these substances it will be noted, are themselves capable of being condensed by the hexa-methylene-tetra-amin in the mass upon subsequent heat treatment. When such substances, such for example as phenol, cresol, mono-chloro-phenol or eugenol are used, the percentage of the methylene-containing agent in the mass, such as hexa-methylene-tetra-amin may be proportionately increased, either in the original varnish or solution of by adding to the eugenol, phenol, or like substance, before the latter is mixed with the dried powder, the additional amount of methylene-containing agent necessary to condense the condensing solvent referred to in the final product. Any of these substances which I have specifically referred to are mixed with the dried powder in such amounts as to equal 10 to 30 per cent. of the weight of phenol resin contained therein and convey to the mass the property of being readily shaped at temperatures below 60° C. or 140° F. They remain in the mass after the final hardening operation, as a useful component of the same, or in the case of some of them, may be partly removed. The mass may be formed into blank pieces, tubes and rods or sheets preparatory to forming in open or flash molds or it may be solidly formed in chase molds and extracted therefrom and cured in ovens wherein the temperature is carefully regulated to 90° F. for a time and subsequently raised to 280° F. by gradual increment of heat. The time required for the hardening operation, wherein the methylene and phenolic bodies react to form an infusible insoluble product, varies between one and ten hours in accordance with the composition and the size of the object. Suitable pigments or dyes may be mixed with the mass, if desired.

Masses of the second class may be made by mixing the thoroughly dehydrated phenol resin previously described, with from 5 to 30 per cent. of its weight of anhydrous phenol and 5 to 40 per cent. of its weight of mono-chloro-naphthalene or equivalent non-condensing solid solvent, which must be in fluid condition when used and from 12 to 22 per cent. of the hardening agent which may be a methylene amin, such as hexa-methylene-tetra-amin, or tri-oxy-methylene or other anhydrous polymer of formaldehyde. The phenol resin used in this mass is preferably one of high melting point. The melting point of the resin may be raised as desired, by treating the same with a metallic or earthy oxid or by slightly increasing the formaldehyde in the initial manufacture of the resin above the proportions given in the formulas for making the same, described in my application, Ser. No. 496,060, and Patent No. 1,020,593, referred to. When an oxid is used for the purpose of raising the melting point of the resin, the same may be mixed therewith previous to dehyration, in various proportions determined by experiment in accordance with the melting point desired. Suitable oxids for this purpose are calcium hydroxid, magnesium hydroxid, barium hydroxid, lead hydroxid, zinc hydroxid, lithium hydroxid and strontium hydroxid, and they may be added in the proportion of from 2 to 4 per cent. of the weight of the resin.

The phenol and mono-chloro-naphthalene used in this process are mixed and the methylene-containing hardening agent is ground in the mixture and the mass thus formed is mixed cold with the powdered phenol resin and the mass then preferably thoroughly mixed on mixing rolls. To this mass suitable fillers may be added up to 100 per cent. of the weight of the resin, if an organic filler is used and still larger amounts if a mineral filler is used. The mass thus formed is plastic when cold and its degree of plasticity may be regulated by the percentage of phenol and mono-chloro-naphthalene added. The mass is adapted to be pressed and cured in open or flash molds at from 220° F. to 320° F. or somewhat higher, if desired, and may also be used as a cement and as a covering for wooden or other objects and subsequently cured.

Instead of phenol and mono-chloro-naphthalene mentioned in the above example, any of the solid solvent ingredients mentioned in the preparation of the first mass may be used alone or in conjunction with each other. The hardest and strongest products, are, however, attained when the plasticity agent is admixed with some free anhydrous phenol which is itself condensed and hardened by that portion of the methlyene-containing hardening agent in the mass which is provided for the condensation of the same, as stated. If, however, phenol alone is used as the cold-plastic agent, the amount of phenol which must be added to the mixture for this purpose, renders it necessary to add considerable quantities of the anhydrous methylene-containing agent to the mass which considerably increases the cost of the product. Therefore, as stated, I prefer to use a mixture of anhydrous phenol and mono-chloro-naphthalene, or other non-condensing solvent, for the plasticity agent. In addition to the previously mentioned solid solvents, certain others may be used which form eutectic mixtures, and remain fluid at normal or room temperatures, such as mixtures of phenol and naphthalene, phenol and mono-nitro-naphthalene, naphthalene and mono-chloro-naphthalene, and penta-chloro-phenol and mono-chloro-naphthalene.

Compositions of classes 1 and 2 may be made almost explosive in the rapidity of their hardening, if desired, by the addition of certain accelerating agents, such as anilin hydro-chlorid, tetra-chloro-toluene, and pinene-hydro-chlorid.

Masses of the third class are made by obtaining an anhydrous phenol resin which has been so formed as to have a high melting point. This may be accomplished, as stated, by increasing the formaldehyde proportion in the resin or by treating the resin with a metallic or earthy oxid. The melting point of the resin should be increased to a temperature above that at which the reaction between the hardening agent and the resin takes place. The resin of high melting point is powdered and mixed with a suitable amount of a methylene-containing hardening agent such as hexa-methylene-tetra-amin and from 5 to 30 per cent. of its weight of a volatile solvent, the boiling point of which is higher than the temperature of the hardening reaction between the methylene and the resin, which temperature may be from 220° F. to 260° F. Because of the high boiling point of the solvent a part of the same may remain in the mass during the hardening reaction without causing bubbling or internal pressure. Such solvents are acetylene-tetra-chlorid, amyl alcohol and amyl acetate. Because, however, of the volatility of such substances as these, they may, to a considerable extent, be dried out before hardening. Acetylene tetra-chlorid for example, has a high boiling point, but because of its volatility it readily evaporates. If such a substance remains to any extent, within the mass during the hardening reaction, it will not cause bubbling, but because of its volatility only a small amount of it may be in the mass during hardening. The methylene-containing agent is used in sufficient quantity to harden the phenol resin upon subsequent reaction and may be from 8 to 12 per cent. of the phenol resin if hexa-methylene-tetra-amin is used as the hardening agent.

The powdered resin and the solvent may be mixed on mixing rolls with from 20 to 100 per cent. of the weight of the resin of organic filler such as wood flour or the like, or with still greater percentage of mineral fillers. This mass is adapted to be first submitted to a drying operation below the hardening temperature and subsequently hardened at such higher temperatures as the particular solvent used will permit without puffing or disrupting the molded object. For example, if acetylene-tetra-chlorid is used as the volatile solvent the drying temperature may be from 140 to 170° F. and the hardening temperature from 200 to 240° F. for from one to two hours. If the solvent is amyl alcohol which boils at 278° F., the drying temperature may be 140 to 170° F. and the hardening temperature from 200 to 270° F.

In addition to the plasticity agents mentioned in the preparation of the various masses, one or more of the other solid solvent ingredients described in my copending application referred to, may be incorporated with the mass, if desired. For example, it is advisable when tri-oxy-methylene is used as the hardening agent in the preparation of the second mass described, to add a suitable proportion of a water-fixing solid solvent, such as benzoic anhydrid or phthalic anhydrid, and in cases where hexa-methylene-tetra-amin is used as the hardening agent, a solid solvent capable of combining with the liberated ammonia may be used, such as benzoic or phthalic anhydrid or tetra or penta chloro phenol, described in my Patent Number 1,046,137, dated December 3, 1912. The term "phenolic body", where employed in the claims, will be understood as including phenol, cresol, and derivatives, such as chloro-phenols, as described herein.

Having now described my invention what I claim as new and desire to secure by Letters Patent is:—

1. As a new composition of matter, a mixture comprising fusible phenol resin, an anhydrous methylene-containing hardening agent therefor, an inert filler, anhydrous phenol, and mono-chloro-naphthalene, the said phenol and mono-chloro-naphthalene being sufficient in quantity to render the mass plastic at comparatively low temperatures, and said hardening agent being sufficient in quantity to condense the phenol as well as the phenol resin, on subsequent heat treatment, substantially as described.

2. As a new composition of matter, a mixture comprising fusible phenol resin, an anhydrous methylene-containing hardening agent therefor, an inert filler, and an anhydrous organic fluid comprising a phenolic body, contained in and absorbed by the mass, the said fluid being sufficient to render the mass plastic at comparatively low temperatures, and the said hardening agent being sufficient to condense the phenol as well as the phenol resin, on subsequent heat treatment, substantially as described.

3. As a new composition of matter, a mixture comprising fusible phenol resin, an anhydrous methylene-containing hardening agent therefor, and an organic fluid comprising a substance capable of being condensed by said hardening agent, said fluid being contained in and absorbed by the mass and being sufficient to render the mass plastic at comparatively low temperatures, and the said hardening agent being sufficient to condense the said substance as well as the phenol resin, upon subsequent heat treatment, substantially as described.

4. As a new composition of matter, an anhydrous fusible mixture in solid form comprising a mass capable of transformation by chemical reaction upon application of sufficient heat to form a hard infusible phenol-methylene condensation product, and an organic fluid contained in and absorbed by the mass, adapted to render the same plastic at comparatively low temperatures, and comprising a material capable of condensation with methylene-containing elements in said mass during sufficient heat treatment, the said methylene-containing elements being present in the mixture in an amount sufficient not only to cause the said transformation of the mass but also to condense the said material as a part of the mass, substantially as described.

5. As a new composition of matter, a mass comprising substances capable of transformation by chemical reaction upon application of sufficient heat to form a hard infusible phenolic condensation product, and a mixture of organic substances, which is fluid at room temperatures, contained in and absorbed by the mass, adapted to render the mass plastic at comparatively low temperatures, and comprising a material capable of condensation with said first named substances during sufficient heat treatment, and a material which is not capable of such condensation, substantially as described.

6. As a new composition of matter, a mass which is sufficiently plastic to be readily worked on mixing rolls at temperatures below 60° C., and which is capable of being rendered hard, infusible and insoluble by heat treatment, comprising a fusible phenolic condensation product having a melting point considerably in excess of 60° C., a methylene-containing hardening agent therefor, and an organic fluid comprising a substance capable of being condensed by said hardening agent, said fluid being contained in and absorbed by the mass and being of such a nature and proportion as to render the mass plastic as stated, and the said hardening agent being sufficient to condense the said substance as well as the said fusible condensation product, upon sufficient heat treatment, substantially as described.

7. As a new composition of matter, a mixture comprising approximately 100 parts anhydrous phenol resin, 12 to 22 parts methylene-containing hardening agent therefor, 5 to 30 parts anhydrous phenol, and 5 to 40 parts mono-chloro-naphthalene, substantially as described.

8. As a new composition of matter, an anhydrous fusible mixture in solid form of ingredients adapted on application of sufficient heat to form a hard insoluble infusible phenolic condensation product, the said mixture being sufficiently plastic and cohesive at temperatures below 60° C. to be readily squirted into tubular form, but not becoming liquid at such temperatures, substantially as described.

This specification signed and witnessed this 3d day of October 1911.

JONAS W. AYLSWORTH.

Witnesses:
DYER SMITH,
A. C. PARHAM.